(12) United States Patent
Hoff

(10) Patent No.: US 8,716,599 B2
(45) Date of Patent: May 6, 2014

(54) PIPELINE CONTINUITY CONNECTOR

(76) Inventor: Don Hoff, Aurora, CO (US)

( * ) Notice: Subject to any disclaimer, the term of this patent is extended or adjusted under 35 U.S.C. 154(b) by 246 days.

(21) Appl. No.: 13/185,279

(22) Filed: Jul. 18, 2011

(65) Prior Publication Data

US 2013/0020127 A1   Jan. 24, 2013

(51) Int. Cl.
*H02G 15/02* (2006.01)

(52) U.S. Cl.
USPC ........................................................ 174/74 R

(58) Field of Classification Search
CPC ......... H02G 15/02; F16L 25/01; H01R 31/08; H01R 2101/00
USPC .......................................... 174/74 R; 439/92
See application file for complete search history.

(56) References Cited

U.S. PATENT DOCUMENTS

| | | | |
|---|---|---|---|
| 3,800,217 A | 3/1974 | Lowrance | |
| 3,857,994 A * | 12/1974 | Neale, Sr. | 174/78 |
| 4,352,065 A | 9/1982 | Rogachev et al. | |
| 4,560,225 A * | 12/1985 | Margaroli et al. | 439/422 |
| 4,633,363 A | 12/1986 | Bordner | |
| 4,712,182 A | 12/1987 | Wakamori et al. | |
| 4,906,027 A | 3/1990 | De Gruijter | |
| 4,934,952 A * | 6/1990 | Banker | 439/92 |
| 6,737,772 B2 * | 5/2004 | Tanaka et al. | 310/71 |
| 6,800,812 B1 * | 10/2004 | Franks, Jr. | 174/136 |
| 2009/0044396 A1 | 2/2009 | Johnstone | |
| 2010/0102038 A1 | 4/2010 | Baum | |
| 2011/0061463 A1 | 3/2011 | Ersoy et al. | |

* cited by examiner

*Primary Examiner* — William H Mayo, III
*Assistant Examiner* — Hiram E Gonzalez
(74) *Attorney, Agent, or Firm* — Russell T. Manning; Marsh Fischmann & Breyfogle LLP

(57) ABSTRACT

Provided herein is a connecting strap or spanning strap that is adapted for use in interconnecting adjacent insulated and/or electrically isolated pipeline sections to provide electrical continuity. Various aspects of the spanning strap are based on the realization that different attachment mechanisms may benefit from differing geometries of the spanning strap. Specifically, it's been determined that the geometry of an attachment aperture extending through the connection strap for use in welding or soldering strapped an underlying surface may be advantageously designed.

12 Claims, 8 Drawing Sheets

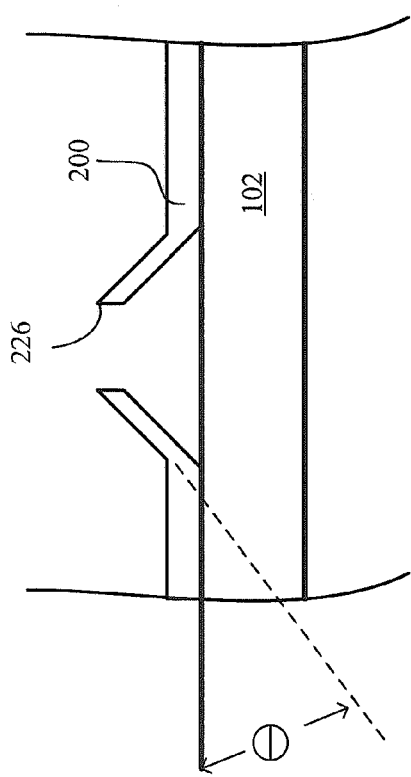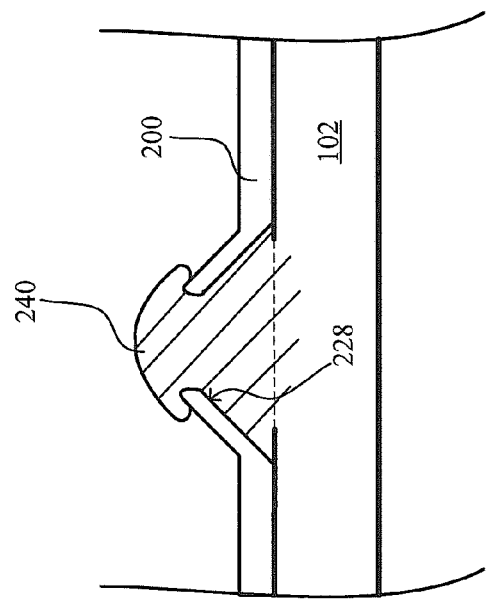

PIPELINE CONTINUITY CONNECTOR

FIELD

The present disclosure is directed to pipeline monitoring and corrosion protection. Specific aspects of the disclosure are directed to establishing and maintaining electrical continuity between adjacent underground pipe sections and more particularly for providing electrical continuity between adjacent pipe sections that are otherwise insulated or isolated from one another.

BACKGROUND

Liquids, gases, water and wastewaters are commonly transported via pressurized pipelines a majority of which are buried. Once in place, such pipelines are subjected to various forms of damage including external damage, soil movements/instability and third party damage. Additionally, buried pipelines are subject to environmental damage. That is, buried pipelines, especially cast iron and steel pipelines, are susceptible to corrosion.

Buried pipelines usually receive one or more forms of external corrosion protection. A protective coating represents a primary form of protection while cathodic protection (CP) represents a secondary form of protection in some instances. The CP system is designed to protect the external pipeline surface against corrosion at coating defects that inevitably occur as the coating condition tends to deteriorate with time. In such corrosion protection systems, regular inspections are made to assess the rate of change in physical condition of the buried pipeline. Such inspection may provide an estimate of how much longer a pipeline can be expected to operate safely and productively and can also be used to plan for remedial action if this predicted life is below requirement Various corrosion monitoring/inspection techniques are employed in the pipeline industry, such as test station potential readings and Close Interval Potential Surveys (CIPS). These techniques are aimed at assessing the CP effectiveness of the pipeline between permanent test stations. In this regard, pipelines are equipped with permanent test stations where electronic leads are attached to the pipeline to allow above-ground measuring of pipe-to-soil potential. This potential should be sufficiently cathodic to ensure adequate corrosion protection but not excessively cathodic to produce coating damage and/or hydrogen embrittlement.

In such techniques, an operator establishes an electrical connection to the pipeline by means of an above ground wire that extends between test stations. The pipeline potential is measured with a set of reference electrodes at ground level, positioned directly over the pipeline, at intervals of, for example, about 1 meter. The potentials measured above ground can provide an indication of a breakdown in the protection coating of the buried pipeline. For instance, a change in potential at a given location between testing periods or changes in potential relative to adjacent potentials, may indicate that the protective coating is breaking down or has been breached in the measured region of the pipeline. Common to such pipeline monitoring techniques and corrosion control techniques is the requirement that the pipeline itself to carry a current/voltage.

SUMMARY

Provided herein is a connecting strap or spanning strap that is adapted for use in interconnecting adjacent pipeline sections to provide electrical continuity. Various aspects of the spanning strap are based on the realization that different attachment mechanisms may benefit from differing geometries of the spanning strap. Specifically, it's been determined that the geometry of an attachment aperture extending through the connection strap for use in welding or soldering strapped an underlying surface may be advantageously designed.

According to the first aspect, a spanning strap is provided that includes an aperture with a peripheral edge that has a thickness that is reduced in relation to the thickness of the spanning strap. In such an arrangement, this peripheral edge more readily melts during a welding or soldering and thereby provides improved connection between the strap and an underlying pipe. According to this aspect, the spanning strap comprises a conductor/conductive metallic strap including an elongated body section extending between first and second ends. Generally, the strap has uniform thickness between a planar top surface and a planar bottom surface. First and second apertures are disposed proximate to the first and second ends of the metallic strap. A peripheral edge of at least one of the first and second attachment apertures has a thickness is less than one half of the thickness of the strap as measured between the planar top and bottom surfaces. In further arrangements, the peripheral edge thickness may be less than one fourth of the thickness and or the peripheral edge may come to a tapered point.

In another aspect, a spanning strap is provided that includes one or more frustoconical attachment apertures. In this aspect, a conductive metal strap extends between first and second ends and has a substantially uniform thickness between a planar top surface and a planar bottom surface. At least a first frustoconical aperture is disposed proximate to one end of the conductive metallic strap. A periphery of this apertures is disposed above a planar top surface of the metallic strap. In this regard, a slanting sidewall extends between the peripheral edge of the aperture and the planar top surface. Typically, this frustoconical sidewall is disposed and included angle between about 15 and 70° relative to the planar top surface. Likewise, a lower sidewall extends between the peripheral edge and the bottom planar surface of the strap. As will be appreciated, this lower sidewall forms a depressed or recessed surface relative to the planar bottom surface. In use, such a frustoconical aperture allows for preferentially attaching the metallic strap using differing types of attachment mechanisms. Further, the peripheral edge of the aperture may have a thickness that is less than the thickness between the planar top and bottom surfaces of the strap.

In any aspect, the spanning strap may further include a nonconductive coating that extends over at least a portion of the body section of the spanning strap area in such a coating provides where and corrosion protection for the spanning strap. In one arrangement, the nonconductive coating is polymeric material. In another arrangement, the nonconductive coating is formed of a heat shrink tubing applied to the body section of the metallic strap.

BRIEF DESCRIPTION OF THE DRAWINGS

For a more complete understanding of the present disclosure and further advantages thereof, reference is now made to the following detailed description taken in conjunction with the drawings in which:

FIG. 8A illustrates a cross-sectional view of a frustoconical attachment aperture applied to a pipe surface for thermite attachment.

FIG. 8B illustrates a thermite weld encapsulating the frustoconical attachment aperture and connecting the attachment aperture to an underlying pipe.

DETAILED DESCRIPTION

Reference will now be made to the accompanying drawings, which at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Figure 1:
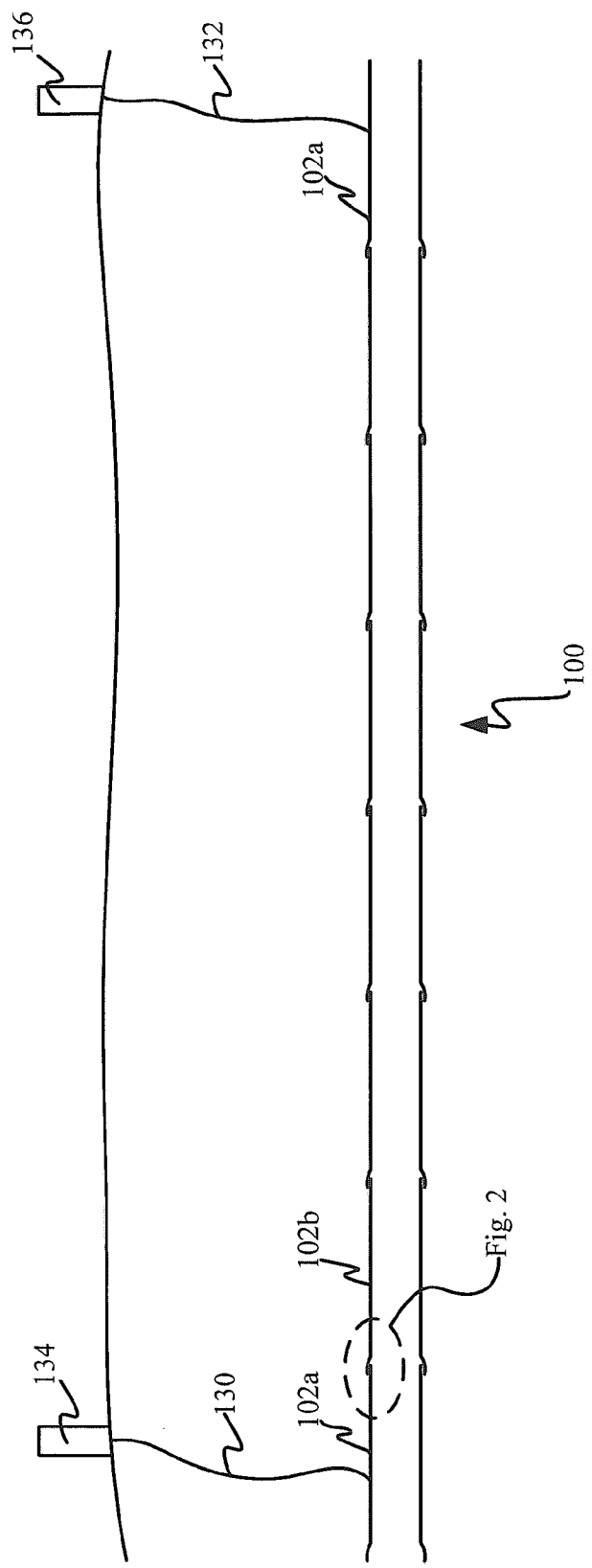
FIG. 1 illustrates a cross-sectional side-view of a buried pipeline.
Figure 2:
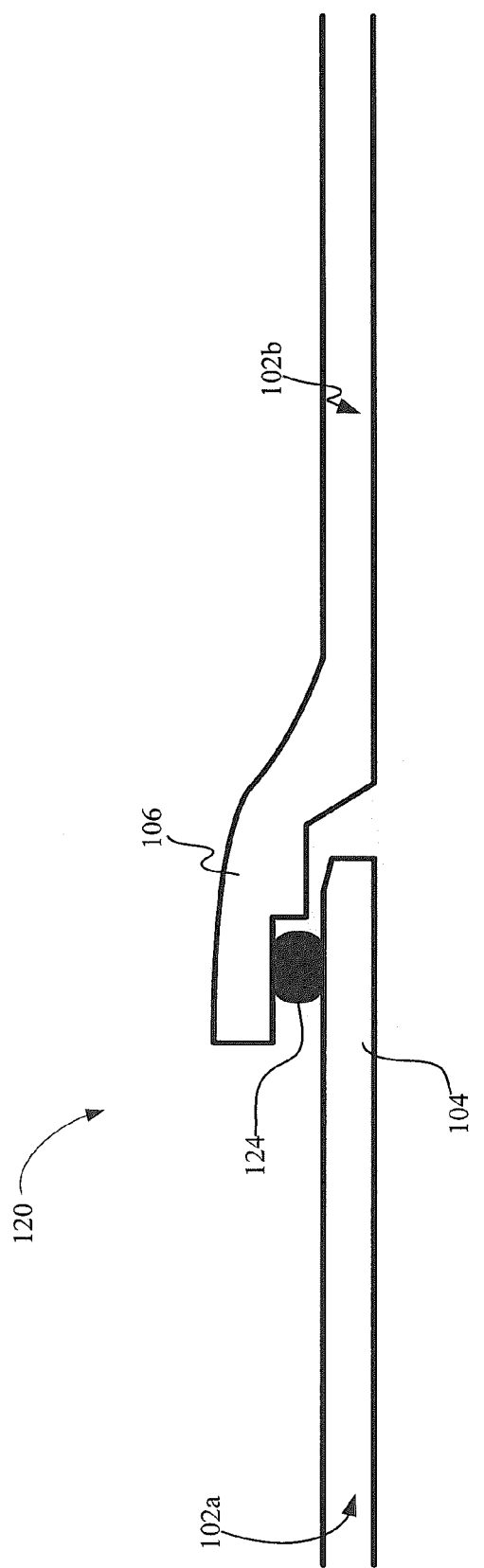
FIG. 2 illustrates a cross-sectional view of a portion of a pipe joint.

FIG. 1 illustrates a cross-sectional side view of an underground pipeline 100 including multiple pipe sections 102a-n. Each pipe section 102 includes a bell end 104 and a spigot end 106. See FIG. 2. The spigot end 106 fits inside of the bell end 104 to form a joint between adjacent pipe sections. FIG. 2 illustrates an enlarged partial cross-sectional view of a pipe joint 120 in accordance with the bell and spigot pipe sections of FIG. 1. As illustrated, a seal element 124 is included between the bell end 104 and the spigot end 106 to form a watertight connection there between. The seal element may include, for example, an o-ring/gasket or any other appropriate sealing element. Such sealing elements 124 often insulate and electrically isolate the spigot end 106 of a first pipe section 102a from the bell end 104 of an adjacent pipe section 102b. In such arrangements, electrical continuity does not exist between adjacent pipes and various corrosion monitoring and prevention systems may not be operative.

One exemplary pipeline corrosion monitoring system is the Close Interval Potential Survey (CIPS) technique. In CIPS, an operator establishes an electrical connection to the pipeline by means of a reference wires 130, 132 that extends between above ground test stations 134 and 136. See FIG. 1. Each test station includes a lead wire that extends down to and is electrically connected to the buried pipeline. The pipeline potential is measured with a set of reference electrodes at ground level, positioned directly over the pipeline, at intervals of, for example, about 1 meter. The potentials measured above ground can provide an indication of a breakdown in the protection coating of the buried pipeline. For instance, a change in potential at a given location between testing periods or changes in potential relative to adjacent potentials, may indicate that the protective coating is breaking down or has been breached in the measured region of the pipeline. Accordingly, if a problem is identified, remedial measures may be taken.

Likewise, the pipeline may include galvanic corrosion protection that may be periodically connected to the pipeline (not shown). In such an arrangement, a wire connects a pipe section with a potential source and a second wire connects the potential source with an anode. The potential source (e.g., voltage source) drives an electronic current through the pipe section and into the anode. An impressed current of electrons then flows between anode and pipeline. The system causes the pipeline 100 to act as the cathode in an electrochemical reaction. Accordingly, the anode experiences corrosion rather than the pipeline. These corrosion monitoring and galvanic protection systems are presented by way of example and do not limit presented inventions.

Figure 3:
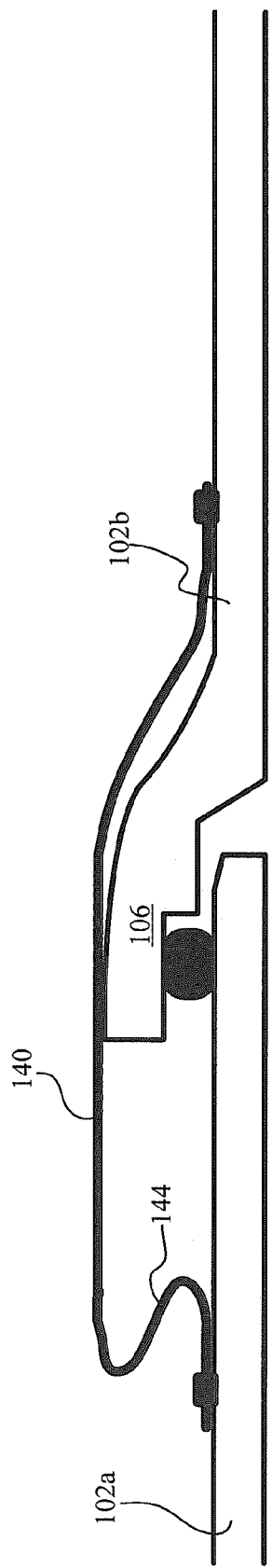
FIG. 3 illustrates a spanning strap applied to the joint of FIG. 2.

As will be appreciated, the functionality for both pipeline monitoring and corrosion protection systems depends on the presence of electrical conductivity and/or continuity between the pipe segments 102a-102n. Such conductivity is generally not an issue in pipelines where adjacent pipe sections are threaded or welded to one another. However, in pipelines where adjacent sections are coupled using a bell and spigot connection, the seal often prevents conductive contact between the adjacent sections. Accordingly, a conductive strap, which spans the pipe joint, typically interconnects electrically conductive surfaces of the adjacent pipe sections. See e.g., FIG. 3. Such "spanners" 140 are sometimes formed as metallic straps (e.g. copper). As illustrated, the spanning strap 140 has a reverse bend slack joint 144 (e.g., an s bend) that allows for some expansion between the adjacent pipe sections 102a, 102b. In such instances, the ends of the spanner 140 may be welded or soldered to the adjacent pipe sections. These spanners are commonly interconnected to the pipeline during its construction when access to the pipe sections is readily available. However, the spanners can become dislodged over time. For instance, continued expansion or contraction of the pipeline may result in disconnection of one or both ends of the spanner 140. Likewise, such spanners and their connecting points are themselves subject to corrosion. Accordingly, such spanners often require replacement in the field when access is limited and means for electrically connecting the spanner to the adjacent pipe sections is limited.

The present invention is based in part on the realization by the inventor that two primary means are utilized to connect such spanning straps in-field replacement applications: pin brazing and exothermic welding. Specifically, each of these methods provide small self-contained attachment mechanism for in-field connection. That is, such systems do not require an electric arc welder or brazing torch. This especially important in situations where the spanner is being placed on the inside of the pipeline and use of an arc welder or brazing torch is not desirable or feasible due to limited access into the pipeline and/or safety concerns.

Figure 4:
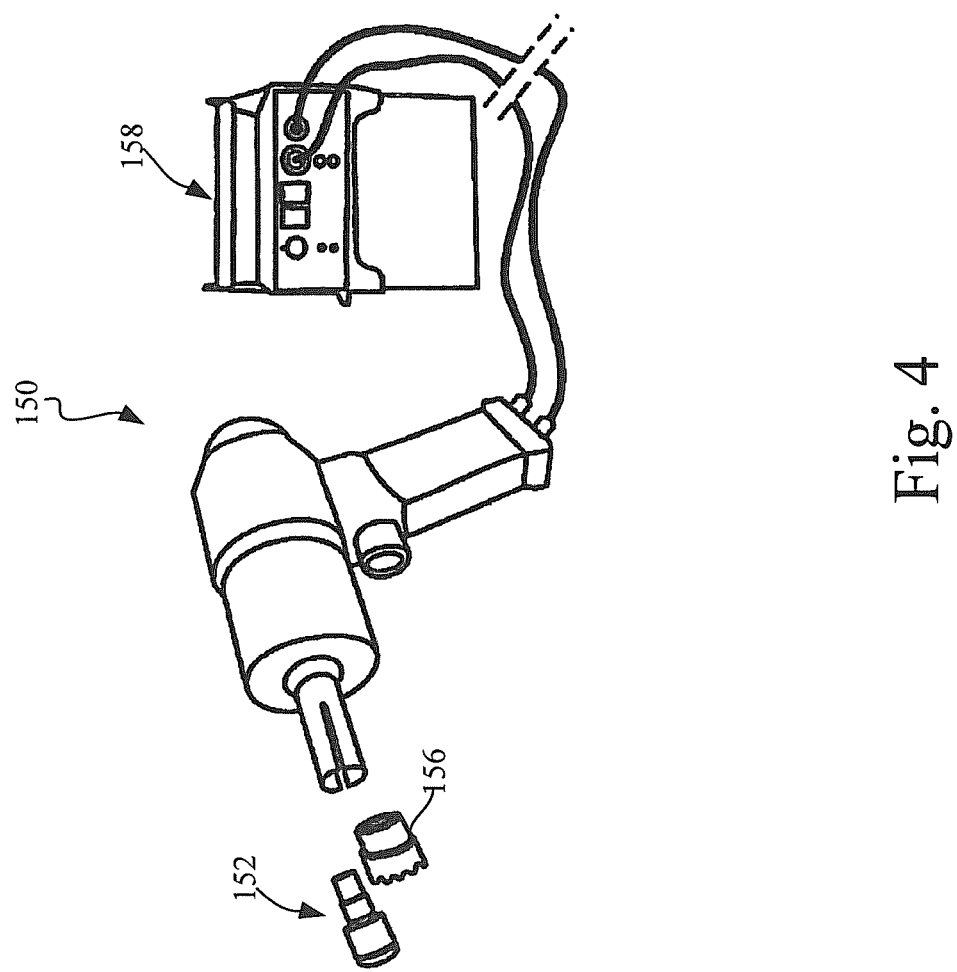
FIG. 4 illustrates a pin brazing system.

Pin brazing is a method for forming a connection where a silver and flux-containing brazing pin is melted down in the eye of a conductor. The equipment comprises a battery powered brazing gun that is normally powered from batteries. FIG. 4 illustrates a pin brazing system 150. The brazing pin 152 is made from a metal such as brass and is formed with a capsule, or head portion, and a control shaft or holding portion. The head portion is typically hollow containing a solder, such as a silver alloy and a flux material. The holding portion is designed to be received in a brazing gun 154 and will be disposed of after completion of the brazing process. In practical a ceramic ferrule 156 carried by the brazing-gun 154 receives the brazing pin 152. The brazing gun 154 is connected to a positive pole and the metal surface, for instance of a pipeline, is connected to the negative pole of a power supply and control unit 158. The end of a spanning strap is placed against a cleaned/grinded portion of the metal surface forming a brazing site. A brazing pin 152 is pressed into the brazing gun 154 and positioned against the metal surface within the circular aperture on the end of brazing strap. The pressure of the brazing pin against the metal surface is given by a mechanical spring in the brazing gun 154.

When the circuit is closed by a relay through a switch in the brazing gun 154 a short circuit is created between the brazing pin 152 and the metal surface. The brazing pin 152 constitutes the electrode in the process. At the same time an electromagnet in the power supply and control unit 158 is activated, the force of which is dimensioned to overcome the force form the mechanical spring, to lift the brazing pin 152 up from the metal surface to a pre-set position above it, for example 2 mm, whereas a welding arc is formed between the brazing pin 152 and the metal surface. The solder and the fluxing agent fixed to the brazing pin 152 start melting down into the aperture soldering/welding the spanning strap to the underlying pipe.

Thermite welding, is a welding process for joining two electrical conductors, that employs superheated copper alloy to permanently join the conductors. The process employs an exothermic reaction typically of a copper thermite composition to heat the copper alloy. The process requires no external source of heat or current making it convenient for in field applications. The chemical reaction that produces the heat is an aluminothermic reaction between aluminum powder and a mixture of copper oxides. These reactants are usually supplied in the form of powders, with the reaction triggered using a spark from a flint lighter or electronic ignition source. Initiation often requires the use of a "booster" material such as powdered magnesium metal. Often, these powdered materials are prepared in pre-mixed shots the composition of which can vary based on their intended applications (e.g., cast iron vs. steel, etc).

The process commonly employs a graphite crucible mold which is typically placed on top of the conductors to be welded (e.g., spanning strap and underlying pipeline). Once positioned, the powered materials are placed within the mold, which is then closed. The molten copper/slag, produced by initiating the reaction, flows through the bottom of the mold and over and around the conductors to be welded (e.g., through an aperture in the end of the spanning strap) forming an electrically conductive weld between them. When the copper alloy cools, the mold is removed.

The present inventor has recognized that such connection methods benefit from different connection geometries between the spanner and an underlying surface. Specifically, it has been determined that by forming an aperture with through the end of a spanning connector a specific geometric configuration, the strength and/or electrical conductivity of these bonds can be enhanced. Specifically, the inventor has recognized that for both pin brazing and thermite welding, it is desirable that the periphery of an attachment aperture be thin (e.g., in relation to the thickness of the spanning strap) to facilitate its melting while the pin is arcing or while the copper/slag flows out of the mold and onto the surface. Further, the inventor has recognized that for thermite welding, it is preferable for the thermite weld to extend around and beneath the lower periphery of the aperture as well as above and around and/or over the upper periphery of the aperture. In this regard, the periphery of the aperture is encased in the solidified copper alloy providing a stronger connection between the strap and underlying pipe.

Figure 5:
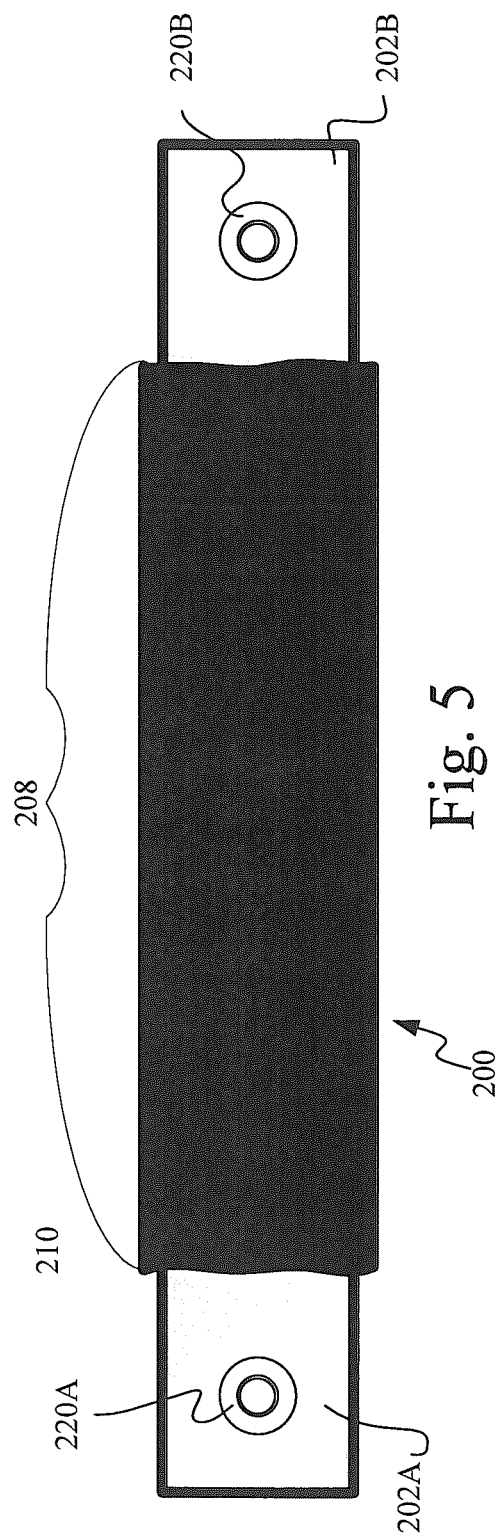
FIG. 5 illustrates a spanning strap in accordance with aspects of the present invention.

In accordance with these recognitions, the inventor has produced a spanning strap 200 that provides enhanced interconnection irrespective of whether thermite welding or pin brazing is utilized to attach to the spanning strap 200 to an underlying surface (e.g., pipe). See FIG. 5. As shown, the strap is made of conductive metal strap (e.g., copper) that may be supplied in desired lengths. As will be appreciated, the length of the strap may be varied based on the size of the pipeline on which the strap is utilized. For instance, small water pipelines (e.g., 12 inch) may utilize a strap that is between about 10 and 14 inches long and for example, 1-2 inches in width. In contrast, large diameter pipelines (e.g., 56 inch) may utilize larger straps and/or multiple straps. In this regard, such straps may be 20-36 inches in length. Furthermore, if necessary the width and/or thickness of the straps may be increased to provide greater conductivity.

In one arrangement, the spanning strap 200 is formed of a copper strip to allow for easy hand forming to a pipe contour. In the illustrated embodiment, the strap further includes an insulative cover 210. In one arrangement, this insulative cover is formed of a polyethylene jacket having a thickness of approximately 0.08 inches. However, it will be appreciated that the thickness of this jacket may be increased or decreased depending on the intended application. Such a jacket may be formed as a coating or, for example, as a tube (e.g., heat shrink tubing) fit to the outside surface of the strap. This insulative jacket provides a number of benefits for the spanning strap. Specifically, when applied to the outside surface of a pipeline, the insulative jacket reduces the interaction of the spanning strap with surrounding media (e.g., ground) reducing the corrosion over the body of the strap. Likewise, on inside pipe applications, the insulative jacket 210 provides a wear covering for the generally ductile (e.g., copper) body of the spanning strap 200. For instance, in applications where the strap is placed on the inside surface of a large water main, users may chip away mortar from the inside surface of the pipes until conductive services are exposed. Upon interconnecting the ends of the strap to the exposed surfaces, these exposed end surfaces may be covered with a mortar. However, to provide flexible coupling between the adjacent pipes, the midsection 208 of the spanning strap must be exposed within the pipe. Accordingly, absent the insulative jacket 210, the spanning strap is exposed and subject to wear and corrosion from fluids passing through the pipe. Accordingly, the incorporation of the insulative cover reduces or eliminates such wear/corrosion.

Figure 6:
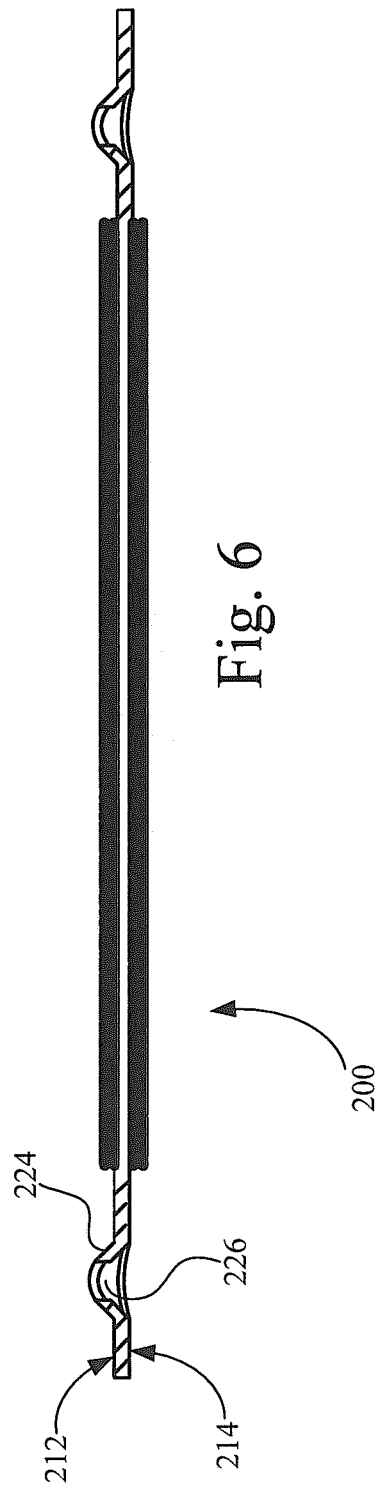
FIG. 6 illustrates a cross sectional view of the strap of FIG. 5.
Figure 7:
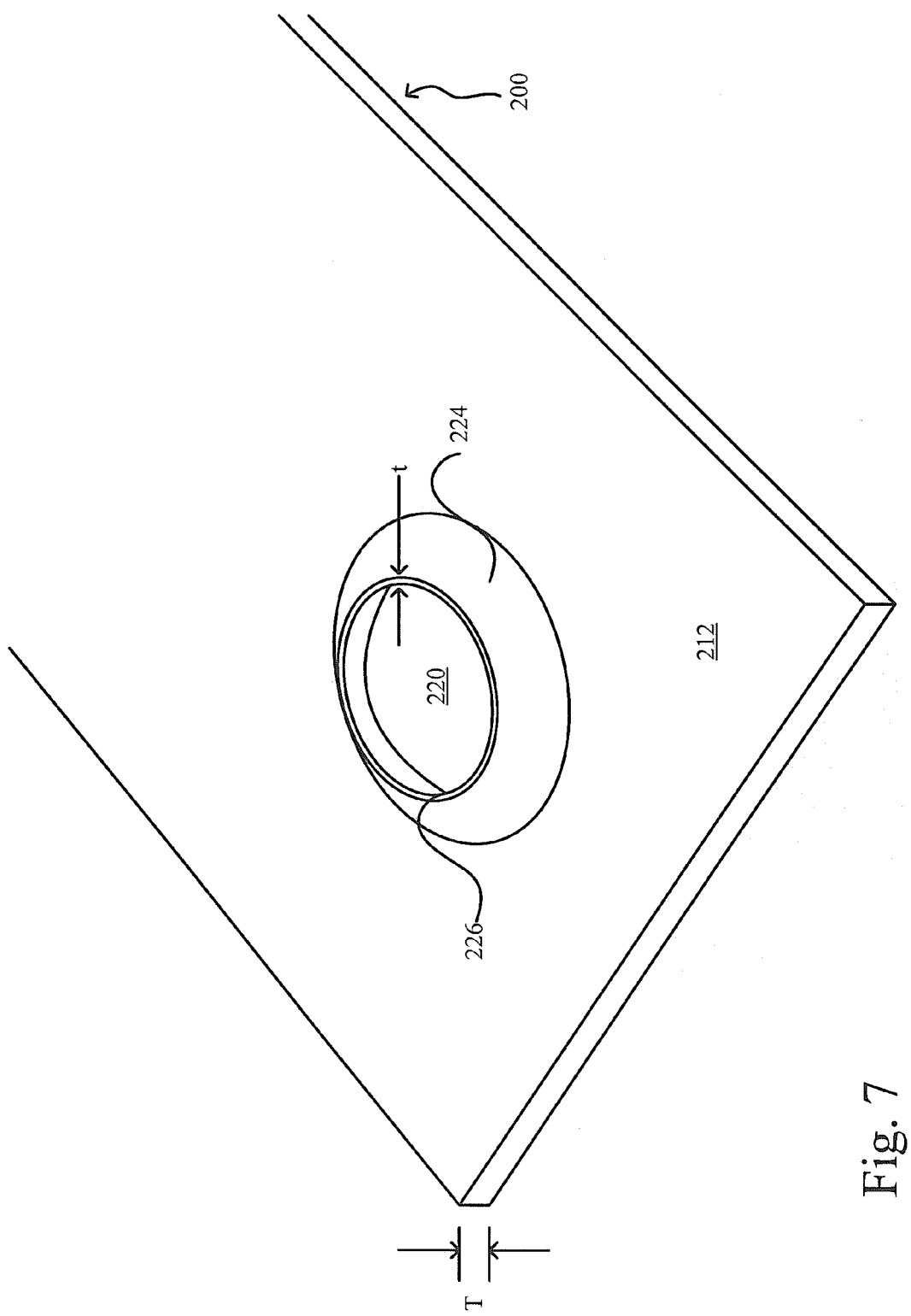
FIG. 7 illustrates a perspective view of a frustoconical attachment aperture.

As shown, the spanning strap includes a first end 202a and a second end 202b separated by a midsection 208 the length of which may, as noted, be varied depending on desired use. Each end 202a, 202b includes an attachment aperture 220a, 220b (hereafter 202, 220 and unless specifically referenced). The attachment apertures 220 provide a connection point for interconnecting the spanning strap 200 to an underlying pipe. Instead of being simple holes formed through the ends 202 of the spanning strap 200, the attachment apertures have a reduced thickness about their peripheral edges to facilitate boding. Further, the attachment apertures may also be formed as raised eyelets as best illustrated by FIG. 6 (a cross-sectional view of FIG. 5) and FIG. 7. As shown, the attachment apertures are frustoconical in shape. In this regard, the central opening of the apertures 220 (e.g., the peripheral edge 226) is raised above a first surface (e.g., top surface) of the strap 200 and depressed/recessed below a second surface (e.g., bottom surface) of the strap 200. Specifically, referring to FIGS. 6 and 7 it is noted that the peripheral edge 226 of the aperture 220 is raised above a first top surface 212 of the spanning strap and depressed/recessed below a second bottom surface 214 of the spanning strap 200. In this regard, the top peripheral edge 226 of the attachment aperture 220 is the termination of a conical sidewall 224 that extends from the generally planar top surface 212 of the strap. This upper sidewall 224 wall is typically disposed at an angle Φ of between about 15 degrees and about 70 degrees relative to the top surface. See FIG. 8A. Further, the thickness 't' of the peripheral edge 226 of the aperture is significantly thinner than the thickness T of the spanning strap. See FIG. 7. This reduced rim thickness 'T' of the top edge 226 improves bonding of the strap during attachment procedures.

FIG. 8A illustrates a bonding strap 200 disposed on the top surface of a pipe section 102. As shown in cross-section, the top edge 226 has thickness that is less than one-half or even less than one-fourth of the thickness of the bonding strap 200. In some arrangements, the peripheral edge may come to a sharp point. As noted, this thin edge around the perimeter of the attachment aperture has been found to more readily melt during attachment procedure. That is, this thin edge section of the attachment aperture more readily melts when subjected to either thermite welding or pin brazing. In this regard, the thin edge 226 provides a better connection between the weld and the bonding strap and hence the bonding strap and the underlying pipe.

While providing a thinner rim/edge to improve melting of the aperture edge into the attachment means, the geometry of the frustoconical attachment aperture 220 provides further benefits for both thermite welding as well as pin brazing. As illustrated in FIG. 8b, upon forming a thermite weld 240 the frustoconical shape attachment aperture allows for a portion of the thermite weld 240 to extend below the bottom/underside surface 228 of the frustoconical aperture. In addition to extending below the underside surface 228 of the aperture, a portion of the weld 240 may also extend over the top and outside surface 224 of the frustoconical opening 220. In this regard, the peripheral edge 226, in addition to being melted into the weld 240, is trapped between the weld. That is, the weld extends below and over the top of a portion of the frustoconical sidewall. In this regard, the sidewall is trapped between upper and lower portions of the weld and thereby providing a further securement of the bonding strap to the underlying pipe 102.

Figure 9A:
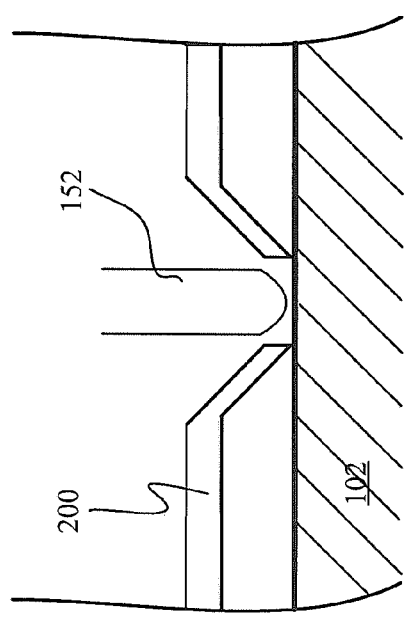
FIG. 9A illustrates a cross-sectional view of a frustoconical attachment aperture applied to a pipe surface for pin brazing attachment.
Figure 9B:
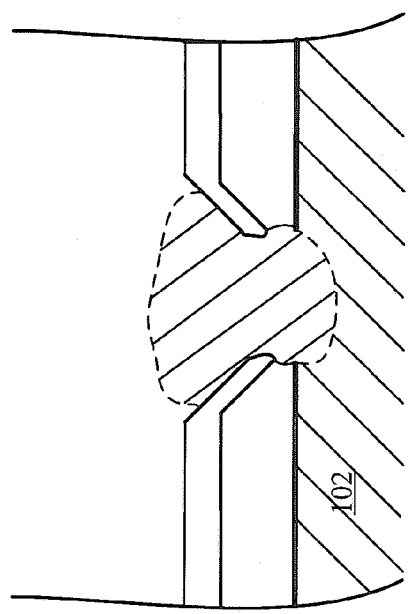
FIG. 9B illustrates a pin braze connecting the frustoconical attachment aperture to an underlying pipe

In relation to pin brazing, the frustoconical aperture likewise produces improved bonding with the underlying pipe. As illustrated in FIGS. 9a and 9b, the attachment aperture may again be utilized interconnect a bonding strap 200 to an underlying pipe 102. However, in this arrangement, rather than placing the recessed surface of the frustoconical attachment aperture adjacent to the surface of the pipe 102, the strap 200 may be turned over to place the raised rim/edge surface of the frustoconical aperture extending from the top surface of the bonding strap against the surface of the pipe section 102. In this regard, the small cross-section top edge 226 of the attachment aperture is disposed against the surface of the pipe section 102. Accordingly, when the pin brazing system 150 is activated, and the pin 152 arcs rather than having to melt the entire thickness of the bonding strap, all that is required is that the reduce cross-section of the frustoconical attachment aperture 220 melt in order to secure the bonding strap to the underlying surface. As will be appreciated, once melting is initiated at the edge 226 melting may proceed rapidly up the sidewall of the frustoconical aperture 220. It has been found that utilization of such a frustoconical/thin edged apertures provides better bonding around the entirety of the aperture in pin brazing applications and thereby improves the strength and conductivity of the weld.

As discussed above, the frustoconical attachment apertures provide benefits for at least first and second different types of bonding applications. Accordingly, most embodiments of the strap will have first and second frustoconical apertures on the first and second ends that are like-configured. That is, both apertures will extend above a first surface (e.g., top surface) and below a second surface (e.g., bottom surface). However, it will be appreciated that in some applications it may be desirable to offset the direction of the apertures. Generally, these apertures will have an opening that is between ⅜ of an inch and ¾ of an inch. Further, it will be appreciated that the size of the aperture may be selected based at least in part on the conductivity requirements of the underlying pipe.

The foregoing description of the presented inventions has been presented for purposes of illustration and description. Furthermore, the description is not intended to limit the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed:

1. A conductive connector for providing continuity between adjacent pipe sections of a pipeline, comprising:
    a conductive metallic strap having an elongated body section extending between first and second ends, said strap having a substantially uniform thickness between a planar top surface and a planar bottom surface;
    a first frustoconical attachment aperture disposed proximate to said first end of said conductive metallic strap, wherein said first frustoconical attachment aperture has a first peripheral edge that is elevated above said planar top surface;
    a second frustoconical attachment aperture disposed proximate to said second end of said conductive metallic strap wherein said second frustoconical attachment aperture has a second peripheral edge that is elevated above said planar top surface; and
    wherein at least one of the first and second peripheral edges of at least one of said first and second frustoconical attachment apertures has a thickness that is less than one-half the thickness between the planar top surface and planar bottom surface of said conductive metallic strap.

2. The device of claim 1, further comprising:
    a non-conductive coating disposed over at least a portion of the body section between said first and second apertures.

3. The device of claim 2, wherein said non-conductive coating comprises a polymeric material.

4. The device of claim 1, wherein said at least one of said first and second frustoconical attachment apertures further comprising:
    an outside sidewall extending from said peripheral edge to said planar top surface, wherein said outside sidewall is disposed at an acute angle relative to said planer top surface.

5. The device of claim 4, wherein said angle is between 15 degrees and 70 degrees.

6. The device of claim 4, further comprising:

a lower sidewall extending from said peripheral edge to said planer bottom surface, wherein said lower sidewall is recessed relative to said bottom planar surface.

7. A conductive connector for providing continuity between adjacent pipe sections of a pipeline, comprising:

a conductive metallic strap having an elongated body section extending between first and second ends, said strap having a substantially uniform thickness between a planar top surface and a planar bottom surface;

a first frustoconical attachment aperture disposed proximate to said first end of said conductive metallic strap, wherein a periphery of said aperture is disposed above said planar top surface of said metallic strap, said attachment aperture further including:

an upper sidewall extending between said periphery of said attachment aperture and said planar top surface;

a lower sidewall surface recessed between the periphery of said attachment aperture and said planer bottom surface; and wherein a peripheral edge of said aperture between said upper sidewall and said lower sidewall has a thickness that is less than one-half the thickness of the metallic strap between the planer top and bottom surfaces.

8. The device of claim 7, further comprising:

a second frustoconical attachment aperture disposed proximate to said second end of said conductive metallic strap, wherein a periphery of said aperture is disposed above said planar top surface of said metallic strap.

9. The device of claim 7, wherein said upper sidewall is disposed at an angle to said planer top surface, wherein said angle is between 15 and 70 degrees.

10. The device of claim 7, wherein said peripheral edge has a thickness of less than one-fourth the thickness of the metallic strap between the planer top and bottom surfaces.

11. The device of claim 7, wherein a peripheral edge of said aperture comprises a tapered point.

12. The device of claim 7, further comprising:

a non-conductive coating disposed over at least a portion of the body of the metallic strap.

* * * * *